United States Patent [19]
Takeda et al.

[11] Patent Number: 5,159,400
[45] Date of Patent: Oct. 27, 1992

[54] APPARATUS FOR TESTING OPTICAL FIBER BY USING DETECTOR HAVING VIRTUALLY BROADENED DYNAMIC RANGE

[75] Inventors: Toshiyuki Takeda; Satoshi Matsuura; Akio Ichikawa, all of Tokyo, Japan

[73] Assignee: Ando Electric Co., Ltd., Tokyo, Japan

[21] Appl. No.: 766,238

[22] Filed: Sep. 24, 1991

[30] Foreign Application Priority Data

Sep. 28, 1990 [JP] Japan .................................. 2-260246

[51] Int. Cl.⁵ .............................................. G01N 21/88
[52] U.S. Cl. .................................................. 356/73.1
[58] Field of Search ............................. 356/73.1, 349; 250/227.19

[56] References Cited

U.S. PATENT DOCUMENTS 4,983,037 1/1991 Messing et al. .................... 356/73.1

Primary Examiner—Vincent P. McGraw
Attorney, Agent, or Firm—Seidel, Gonda, Lavorgna & Monaco

[57] ABSTRACT

An optical fiber testing apparatus for testing an optical fiber as to presence and location of a fault such as breakage by inputting a pulsed coherent light beam to the optical fiber and synthesizing a return light beam reflected back from the optical fiber with a reference light beam having a frequency deviated from the pulsed light beam by a predetermined amount, wherein the synthesized waveform is detected through optical heterodyning. The electric signal obtained from the heterodyning detection is detected by an envelope detector, of which dynamic range is effectively virtually broadened by using correcting data prepared previously. The optical fiber test can be accomplished through a single measurement without involving expensiveness of hardware.

1 Claim, 6 Drawing Sheets

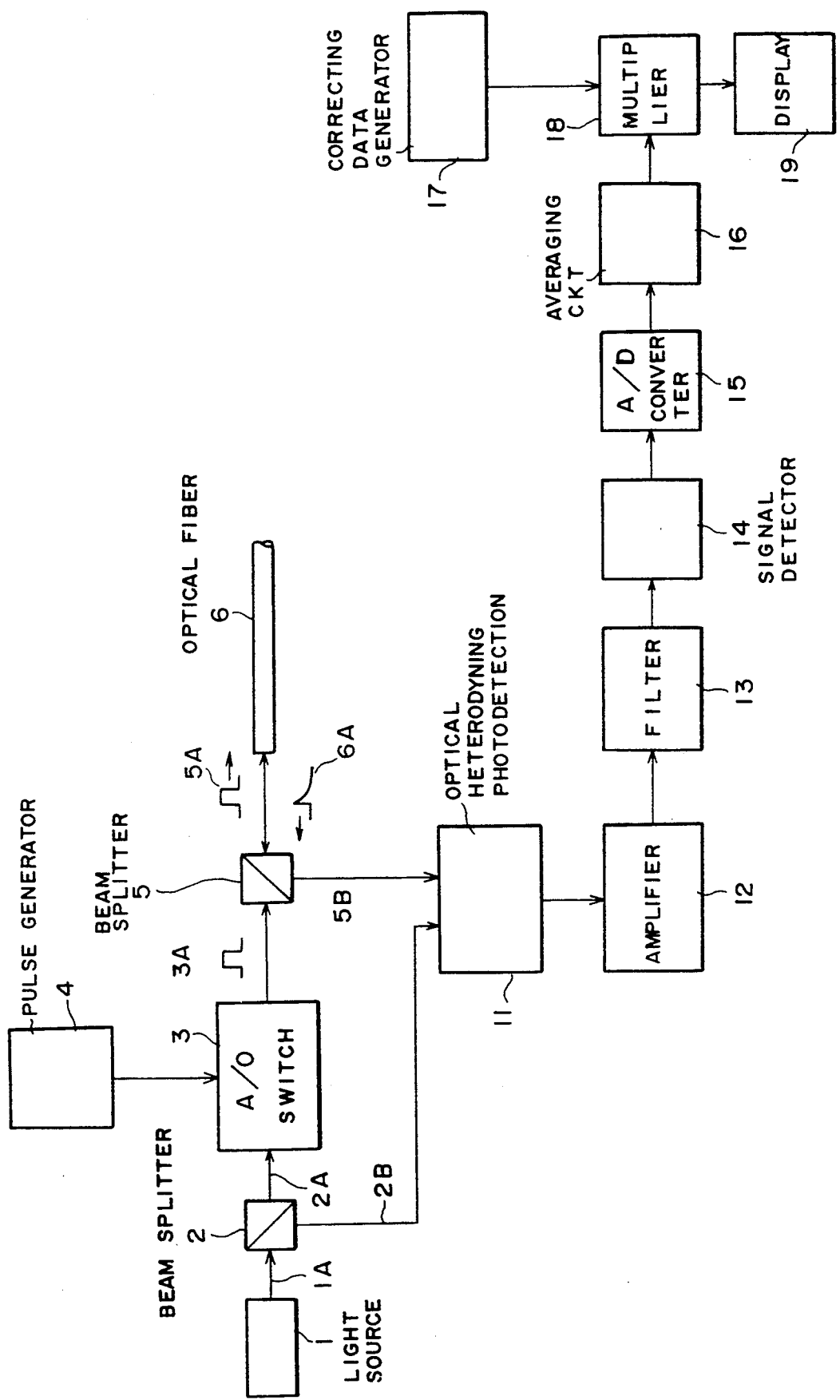
F I G. 1

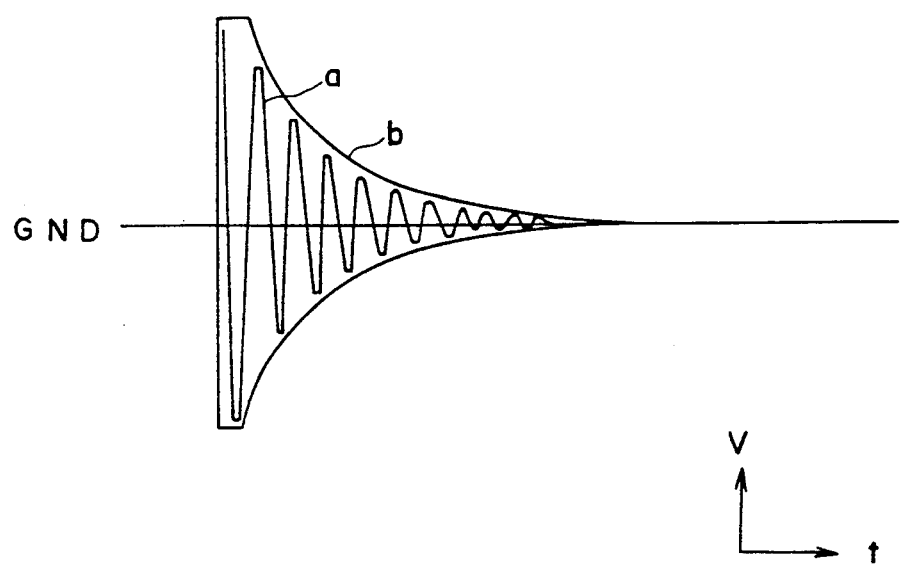
F I G. 2
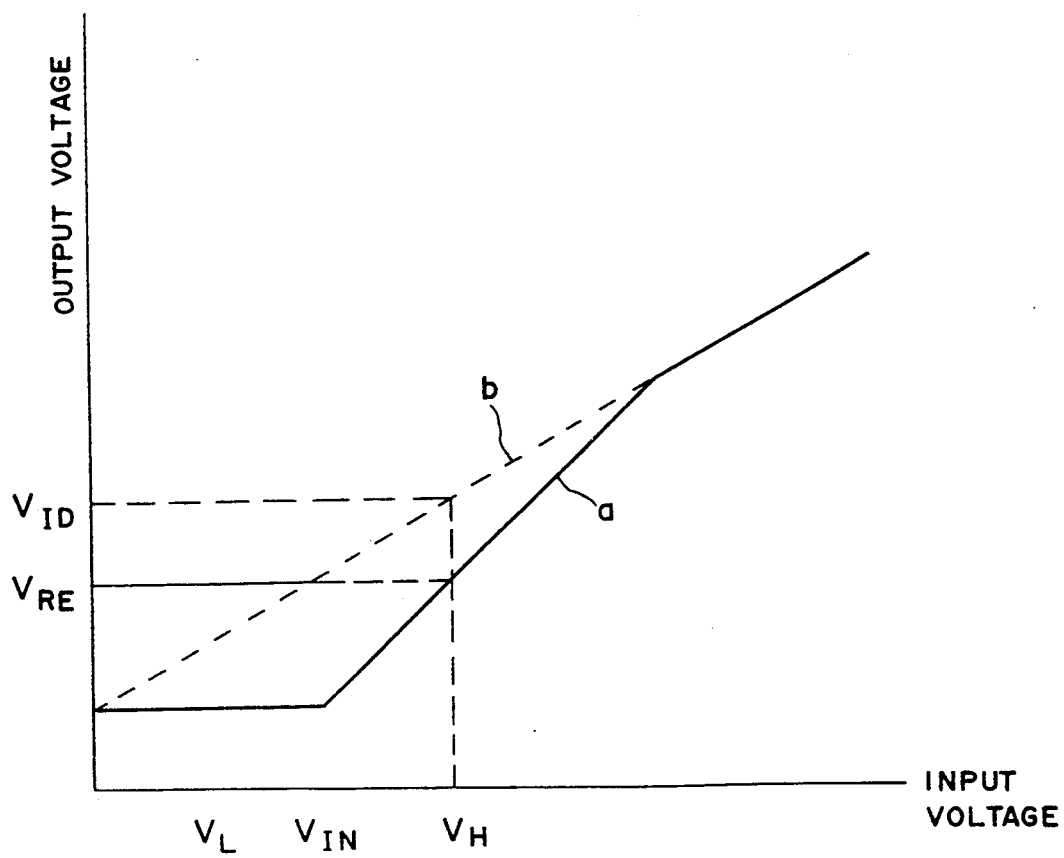
F I G. 3

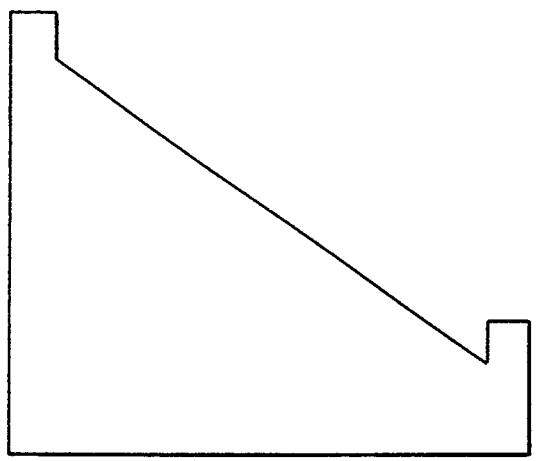
F I G. 6
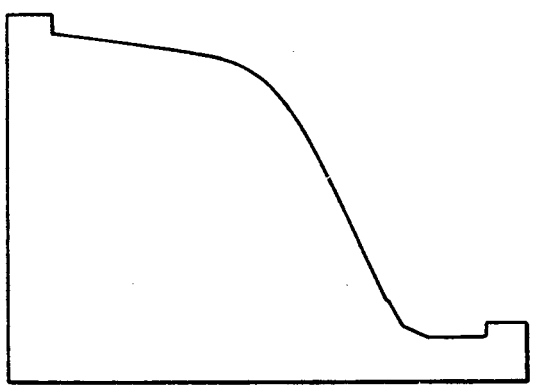
F I G. 7

_5,159,400_

APPARATUS FOR TESTING OPTICAL FIBER BY USING DETECTOR HAVING VIRTUALLY BROADENED DYNAMIC RANGE

BACKGROUND OF THE INVENTION

1. Field of the Invention

The present invention relates generally to an optical fiber testing apparatus for locating a possible fault such as breakage in an optical fiber by inputting a coherent light beam to the optical fiber at one end thereof and detecting a return light beam by using an optical heterodyne detection.

2. Description of Related Art

For a better understanding of the present invention, description will be made of an optical fiber testing apparatus known heretofore by reference to FIG. 4.

In this figure, reference numeral 21 denotes a photodetection circuit, 22 denotes an amplifier, 23 denotes a filter, 24 denotes a detector, 25 denotes an analogue-to-digital (A/D) converter, 26 denotes a data processing unit and 27 denotes a display unit.

For testing an optical fiber (not shown in FIG. 4), a coherent light beam emitted by a laser light source of a frequency f (not shown either) is inputted to the optical fiber. A return light beam reflected back from the optical fiber and having a frequency of $f + \Delta f$ is detected by the photodetection circuit 21 through optical heterodyning technique by using a reference light beam of a frequency f derived from the coherent light source. The output of the photodetection circuit 21 is amplified by the amplifier 22, the output of which in turn is supplied to the filter 13 to undergoes limitation in the frequency band and in order to improve the SN ratio. The detector 24 performs an envelope detection on the output signal of the filter 13 which is modulated in amplitude with a carrier frequency of $\Delta f$, to thereby extract only the envelope signal. The output signal of the detector 24 is converted to digital data by the A/D converter 25. The data processing unit 26 averages the digital data supplied from the A/D converter 25 for improving the SN ratio. The display 27 displays the output of the data processing unit 26.

The coherent light type optical fiber testing apparatus is advantageous over a direct detection type optical fiber testing apparatus in that the former can enjoy a broader dynamic range than the latter. However, in the coherent light type optical fiber testing apparatus known heretofore in which the optical heterodyne detection in adopted, limitation is nevertheless imposed on the dynamic range due to the detection characteristic of the detector 24.

FIG. 5 is a view showing graphically a relation between the input voltage and the output voltage of the detector 24 shown in FIG. 4. Referring to FIG. 5, in a region where the slope is constant, i.e. region c, the detection efficiency is constant. It can be said that as this region is wider, the dynamic range is broader.

FIG. 6 shows a waveform obtained as the result of the optical fiber test when an ideal detector is employed as the detector 23, while FIG. 7 shows a corresponding waveform obtained when a conventional diode is employed as the detector.

In the hitherto known optical fiber testing apparatus in which the coherent light beam is used, gain of the amplifier 22 is changed in dependence on divided dynamic ranges of the detector 24 to perform several measurements for testing one optical fiber, the results of which are subsequently synthesized.

FIG. 8 shows waveforms obtained as the result of execution of three successive measurement steps, wherein the result of the first measurement is shown at a with that of the second measurement being shown at b. It the measurement step b, gain of the amplifier 22 is increased beyond that used in the measurement a by an amount corresponding to an allocated dynamic range. In the measurement step c, gain of the amplifier 22 is further increased beyond that employed in the measurement step b by a magnitude corresponding to the dynamic range allocated to this measurement.

FIG. 9 shows a waveform obtained as result of synthesization of the measured waveforms a, b and c.

As will now be understood from the above description made with reference to FIGS. 5 to 9, the prior art optical fiber testing apparatus requires several measurement steps for testing a single optical fiber, involving remarkable time consumption in the test. Further, additional processing is required for synthesizing a plurality of measured waveforms, to make expensive the optical fiber testing apparatus.

SUMMARY OF THE INVENTION

It is an object of the present invention to provide an optical fiber testing apparatus in which a dynamic range of a detector is equivalently broadened by taking advantage of good SN ratio in optical heterodyning detection to thereby allow the optical fiber test to be completed with a single measurement process.

Another object of the invention to provide an improved optical fiber testing apparatus which can perform the test within a relatively short time and which can render unnecessary synthesization processing of the waveforms as measured.

In view of the above and other objects which will become more apparent as description procedes, there is provided according to an aspect of the present invention an optical fiber testing apparatus for testing an optical fiber as to presence of a fault such as breakage by inputting a pulsed coherent light beam to the optical fiber and synthesizing a return light beam reflected back from the optical fiber with a reference light beam having a frequency deviated from the pulsed light beam by a predetermined amount, wherein the synthesized waveform is detected through optical heterodyning. The testing apparatus comprises a photodetection circuit for detecting the synthesized waveform by the optical heterodyning technique, an amplifier for amplifying the output of the photodetection circuit, a filter for limiting a frequency band of the output of the amplifier, detector for extracting an amplitude-modulation signal having a carrier frequency corresponding to the abovementioned predetermined amount from the output of the filter, an analogue-to-digital converter for converting the output of the detector into a corresponding digital quantity, an averaging circuit for averaging the digital quantity outputted from the analogue-to-digital converter, a correcting data generator for generating data for correcting detection efficiency of the detector, and a multiplier for multiplying the output of the averaging circuit with the output of the correcting data generator.

With the arrangement of the optical fiber testing apparatus described above, the dynamic range of the detector can equivalently or virtually broadened, whereby shortcomings of the prior art apparatus can be avoided.

The above and other objects, features and advantages of the invention will be better understood by reading the following description of an illustrative embodiment taken in conjunction with the drawings.

BRIEF DESCRIPTION OF THE DRAWINGS

FIG. 1 is a block diagram showing a general arrangement of the optical fiber testing apparatus according to an embodiment of the invention;

FIG. 2 is a waveform diagram for illustrating output waveform of a photodetection circuit (11) of the apparatus shown in FIG. 1;

FIG. 3 is a view for graphically illustrating a relation between an input voltage and an output voltage of a detector (14) of the apparatus shown in FIG. 1;

FIG. 6 is a waveform diagram showing a waveform which would be obtained from the test when an ideal detector was employed as the detector (14);

FIG. 7 is a waveform diagram showing a result of measurement obtained when a conventional detector is employed;

DESCRIPTION OF THE PREFERRED EMBODIMENTS

Figure 4:
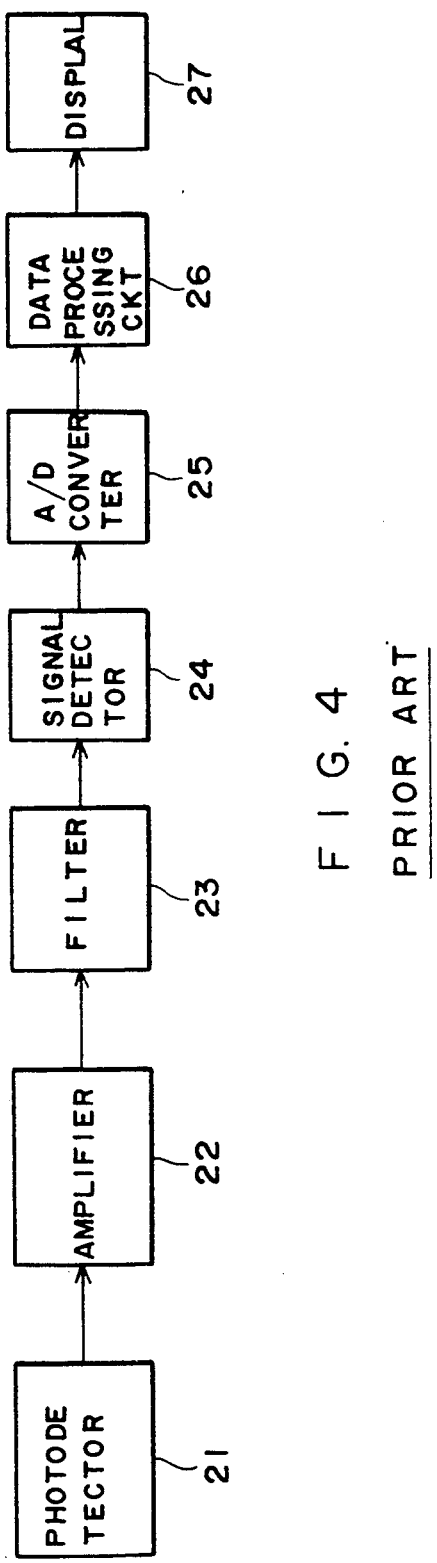
FIG. 4 is a view showing schematically a structure of an optical fiber testing apparatus known heretofore.
Figure 5:
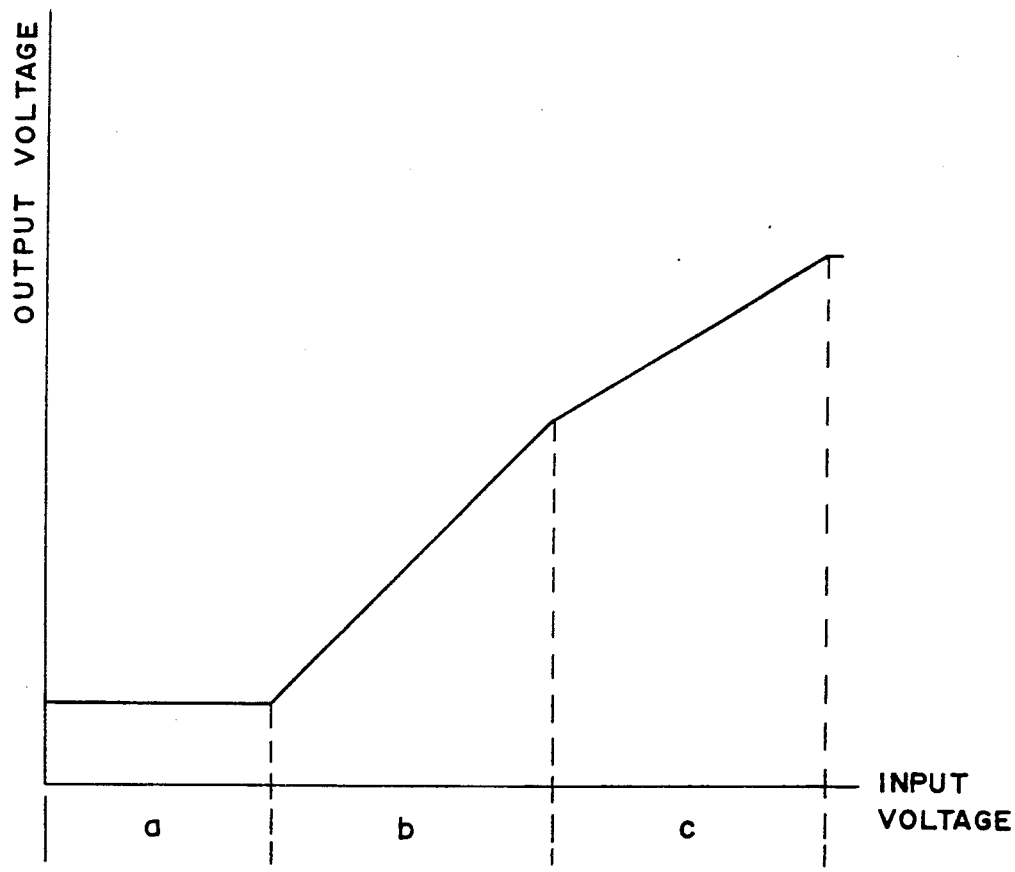
FIG. 5 is a view showing graphically a relation between input and output voltage of detector (14) shown in FIG. 5.
Figure 8A:
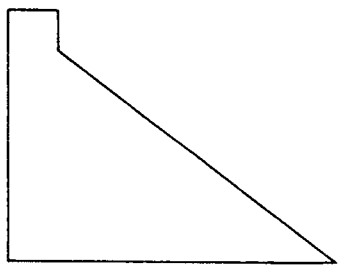
FIGS. 8a–8c are waveform diagrams showing waveforms measured at three steps in consideration of a dynamic range of the detector (14)
Figure 8B:
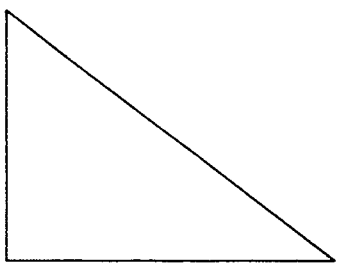
Figure 8C:
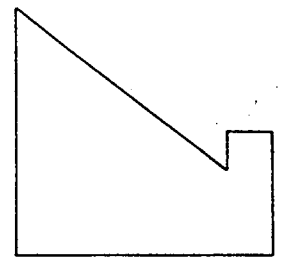
Figure 9:
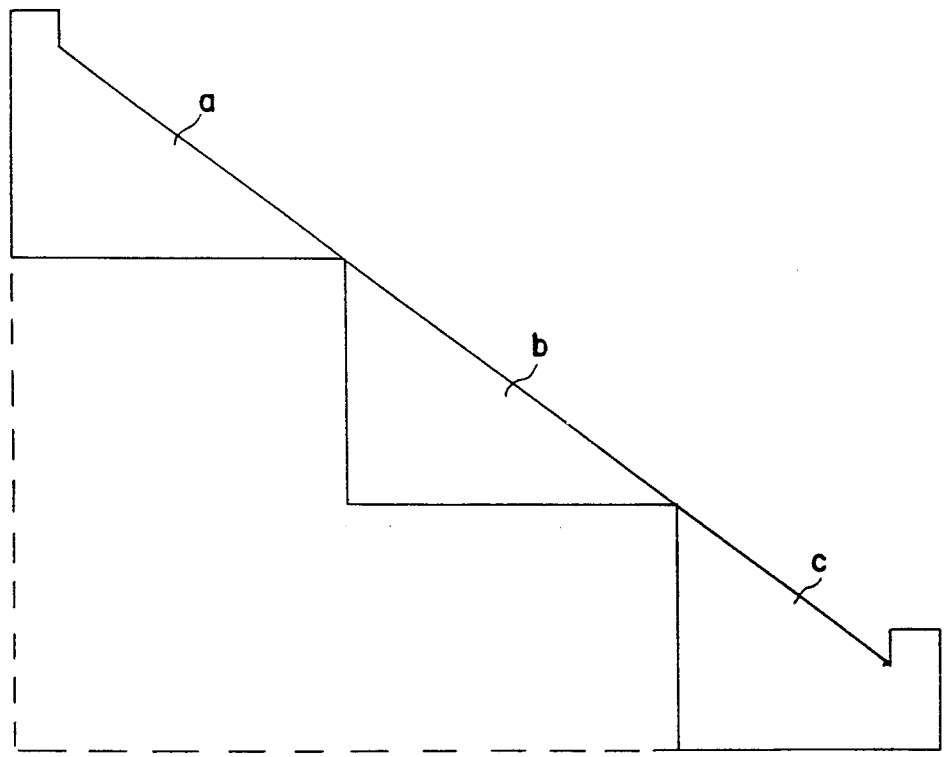
FIG. 9 is a waveform diagram showing a waveform resulting from synthesization of the measured waveforms shown in FIG. 8.

Now, the present invention will be described in detail in conjunction with preferred on exemplary embodiment thereof by reference to the drawings.

FIG. 1 shows generally an arrangement of the optical fiber testing apparatus according to an embodiment of the invention. In this figure, a reference numeral 1 denotes a coherent light source, 2 denotes a first beam splitter, 3 denotes an ultrasonic light modulator also known as acoustooptic modulator (hereinafter also referred to as A/O switch), 4 denotes a pulse generator, 5 denotes a second beam splitter, 6 denotes an optical fiber under test, 11 denotes an optical heterodyning a photodetection circuit, 12 denotes an electric signal amplifier, 13 denotes a band limiting filter, 14 denotes a detector, 15 denotes an analogue-to-digital converter, 16 denotes an averaging circuit, 17 denotes a correcting data generating unit, 18 denotes a multiplier and finally a reference numeral 19 denotes a display unit.

The light source 1 emanates a coherent continuous light beam 1A which is branched into a signal light beam 2A and a reference light beam 2B, respectively, by the first beam splitter 2. The A/O switch 3 converts the signal light beam 2A into a pulsed light beam in response to acoustic pulses supplied from the pulse generator 4. The pulsed light beam 3A undergoes a frequency shift by $\Delta f$ relative to that of the input light beam 2A due to the Doppler effect of the A/O switch 3. The pulsed light beam 3A is splitted to a pulsed transmission light beam 5A by the second beam splitter 5, which beam 5A is inputted to the optical fiber 6. A return light beam 6A reflected from the optical fiber 6 is deflected by the beam splitter 5 to serve as a data light beam 5B. The photodetection circuit 11 detects the data light beam 5B through optical heterodyning with the reference light beam 2B.

FIG. 2 shows a waveform of the output signal of the photodetection circuit 11. In this figure, a curve a represents a carrier frequency signal $\Delta f$ with a curve b representing an amplitude-modulated signal. The amplifier 12 shown in FIG. 1 amplifies the output of the photodetection circuit 11, while the filter 13 limits the frequency band of the amplifier 12 for improving the SN ratio. The detector 14 is constituted by a diode for performing an evelope detection of the signal outputted from the filter 13.

FIG. 3 shows a relation between the input voltage and the output voltage of the detector 14. In this figure, a curve a represents an input-versus-outtput voltage characteristic. The input voltage of $V_H$, the output voltage $V_{RE}$ is obtained. A correcting parameter $\alpha$ is determined according to $V_{ID} = V_{RE} \times \alpha$. Values which the correcting parameter $\alpha$ assumes in a voltage range of $V_L$ to $V_H$ are previously determined as values of a correcting function which is employed for transforming the detection efficiency characteristic into a linear characteristic such as represented by a curve b in FIG. 3.

The averaging circuit 16 performes an averaging processing on the digital data to further enhance the SN ratio. The correcting data generator 17 outputs the correcting function value $\alpha$ determined previously in the form of digital quantity. The multiplier 18 multiplies the output of the averaging circuit 16 with the output of the correcting data generator 17, to thereby eliminate data distortion due to change in the detection efficiency of the detector 14. The output of the mulitiplier 18 is displayed on the display unit 19.

As will be apprecianted from foregoing description, according to the teachings of the present invent, the detection characteristic of the detector (14) designed for performing the envelope detection is corrected by the correcting function, whereby the dynamic range of the detector (14) can equivalently or virtually be broadened. Thus, there can be provided the optical fiber testing apparatus having a broad dynamic range.

Although the present invention has been described in conjunction with the illustrated embodiment, it will be understood that this is only for purposes of illustration and not meant to be limiting. Those of ordinary skill will readily envision numerous modifications and adaptations of the present invention upon review of the disclosure set forth above without departing from the spirit of the present invention. Accordingly, reference should be made to the appended claims in order to determine the full scope of the present invention.

We claim:

1. An optical fiber testing apparatus for testing an optical fiber as to presence of a fault by inputting a pulsed coherent light beam to the optical fiber and synthesizing a return light beam reflected back from the optical fiber under test with a reference light beam having a frequency deviated from said coherent pulsed light beam by a predetermined amount, wherein the snythesized waveform is detected through optical heterodyning technique, said apparatus comprising:
a photodetection circuit for detecting said synthesized waveform through optical heterodyning;
an amplifier for amplifying the output of said photodetection circuit;

a filter for limiting a frequency band of the output of said amplifier;

a detector for extracting an amplitude-modulation signal having a carrier frequency corresponding to said predetermined amount from the output of said filter;

an analogue-to-digital converter for converting the output of said detector into a corresponding digital quantity;

an averaging circuit for averaging said digital quantity outputted from said analogue-to-digital converter;

a correcting data generator for generating data for correcting detection efficiency of said detector; and a multiplier for multiplying the output of said averaging circuit with the output of said correcting data generator.

* * * * *